(12) United States Patent
Wintersteller et al.

(10) Patent No.: US 11,024,499 B2
(45) Date of Patent: Jun. 1, 2021

(54) BODY, ESPECIALLY LAMP BODY, AND METHOD FOR PRODUCING A HERMETIC SEAL

(71) Applicant: Schott AG, Mainz (DE)

(72) Inventors: Fritz Wintersteller, Teisendorf (DE); Helena Blümel, Frontenhausen (DE); Robert Hettler, Kumhausen (DE); Chris Wanless, Thorpe Salvin (GB)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 16/549,875

(22) Filed: Aug. 23, 2019

(65) Prior Publication Data

US 2020/0066506 A1 Feb. 27, 2020

(30) Foreign Application Priority Data

Aug. 24, 2018 (DE) ...................... 10 2018 214 319.6
Jul. 18, 2019 (EP) ..................................... 19186915

(51) Int. Cl.
*H01J 61/36* (2006.01)
*H01J 61/30* (2006.01)
(Continued)

(52) U.S. Cl.
CPC ................ *H01J 61/36* (2013.01); *C03C 3/06* (2013.01); *C03C 3/091* (2013.01); *C03C 4/005* (2013.01);
(Continued)

(58) Field of Classification Search
CPC .......... H01J 61/36; H01J 61/302; H01J 61/16; H01J 61/366; H01J 9/323; H01J 5/36; H01J 5/34; H01J 7/14; H01J 61/24; H01J 61/82; H01J 61/70; H01J 9/38–42; H01J 2209/38; C03C 4/0085; C03C 4/005; C03C 4/02; C03C 3/091; C03C 3/06; C03C 2201/80; C03C 2204/06; C03C 27/044; F21V 3/0615

See application file for complete search history.

(56) References Cited

U.S. PATENT DOCUMENTS 2,316,999 A 4/1943 Spencer
3,140,417 A 7/1964 Tietze
(Continued)

FOREIGN PATENT DOCUMENTS

DE            886 043      8/1953
DE    10 2004 011 555 B3  10/2005
(Continued)

OTHER PUBLICATIONS

VYCOR_Code_7913 data sheet (Year: 2014).*
(Continued)

*Primary Examiner* — Joseph L Williams
*Assistant Examiner* — Jose M Diaz
(74) *Attorney, Agent, or Firm* — Taylor IP, P.C.

(57) ABSTRACT

A body, such as a lamp body, includes a tubular element. At least one conductor is introduced into the tubular element and a glass material surrounds the conductor. The glass material forms a seal between the tubular element and the conductor. The glass material includes a sintered glass, such as a sintered glass ring, and may completely surround the conductor.

20 Claims, 1 Drawing Sheet

(51) Int. Cl.
*H01J 9/32* (2006.01)
*C03C 4/00* (2006.01)
*C03C 3/091* (2006.01)
*C03C 3/06* (2006.01)
*C03C 4/02* (2006.01)
*H01J 61/16* (2006.01)

(52) U.S. Cl.
CPC .............. *C03C 4/0085* (2013.01); *C03C 4/02* (2013.01); *H01J 9/323* (2013.01); *H01J 61/302* (2013.01); *C03C 2201/80* (2013.01); *C03C 2204/06* (2013.01); *H01J 61/16* (2013.01)

(56) References Cited

U.S. PATENT DOCUMENTS

| | | | |
|---|---|---|---|
| 5,979,187 A | 11/1999 | Churchley et al. | |
| 2001/0020820 A1* | 9/2001 | Kaneko | H01J 5/32 313/623 |
| 2007/0120491 A1* | 5/2007 | Bewlay | H01J 61/366 313/634 |

FOREIGN PATENT DOCUMENTS

| | | |
|---|---|---|
| DE | 699 23 261 T2 | 12/2005 |
| DE | 699 31 877 T2 | 12/2006 |
| EP | 0 982 278 A1 | 3/2000 |
| EP | 1 006 560 A2 | 6/2000 |
| EP | 1 598 845 A2 | 11/2005 |
| JP | 2012/199153 A2 | 10/2012 |

OTHER PUBLICATIONS

Liu Yuzhu, Geng Zhiting, Zhuang Weidong, He Huaqiang "Study on thermal expansion behavior of Dy2O3—Al2O3—SiO2", Journal of Rare Earths, 26 (2008) 85-88 (4 pages).
SCHOTT: Technical Data, Glass GS10, Transition Glass, SCHOTT Glass No. 8213, May 2019 (1 page).
SCHOTT: Technical Data, Glass GS20, Transition Glass, SCHOTT Glass No. 8216, May 2019 (1 page).
SCHOTT: Technical Data, Glass GS25, Transition Glass, SCHOTT Glass No. 8218, May 2019 (1 page).
SCHOTT: Technical Data, Glass GS30, Transition Glass, SCHOTT Glass No. 8219, May 2019 (1 page).
SCHOTT: Technical Data, Glass 8228, Transition Glass, Fusible with Quartz Glass and Glass 8229, Sep. 2017 (1 page).
SCHOTT: Technical Data, Glass 8229, Transition Glass, Fusible with Glass 8228 and Glass 8230, Sep. 2017 (1 page).
SCHOTT: Technical Data, Glass 8230, Transition Glass, Fusible with Glass 8229 and Glass 8330, Sep. 2017 (1 page).
Extended European Search Report dated Jan. 23, 2020 for European Patent Application No. 19 18 6915 (8 pages).
German Office Action dated Mar. 22, 2019 for German Application No. 10 2018 214 319.6 (8 pages).

* cited by examiner

BODY, ESPECIALLY LAMP BODY, AND METHOD FOR PRODUCING A HERMETIC SEAL

BACKGROUND OF THE INVENTION

1. Field of the Invention

The present invention relates to a body, especially a lamp body, comprising a tubular element made of a glass or glass-ceramic material, into which at least one conductor is introduced, and a further glass material which surrounds the conductor and is connected to the tubular element. The present invention additionally also relates to a method for producing a hermetic seal between a tubular element and a conductor.

2. Description of the Related Art

In high-temperature light sources there is generally the problem that both the anode conductor and the cathode conductor have to be introduced into the generally tubular filling element, which may be made of a quartz glass and accommodates the lamp, in a hermetically sealed manner. On account of the low thermal expansion of the quartz glass it is necessary to hermetically seal the conductor using a sealing material having a coefficient of expansion that lies between the coefficient of expansion of the filling element and the coefficient of expansion of the conductor. For this purpose, the prior art generally uses a glass bead made of a specific glass material. As glass material for the glass bead, U.S. Pat. No. 5,979,187 B discloses by way of example the use of a GS10 sealing glass, available for example from Transition Glass Products Ltd, Unit 1 Globe Court, Coalpit Road, Denaby Industrial Estate, Denaby, South Yorkshire, United Kingdom. Reference is made in this regard for example to www.transitionglass.com. GS10 glass is a borosilicate glass with an $SiO_2$ content of 84.8 percent by weight, a $Bi_2O_3$ content of 10 percent by weight, an $Al_2O_3$ content of 4.7 percent by weight, a BaO content of 0.45 percent by weight and an $Fe_2O_3$ content of 0.01 percent by weight. The coefficient of expansion of GS10 glass lies in the range of 9.5 to $11.5*10^{-7}$ 1/kelvin in the temperature range of 50° C. to 400° C. A glass bead made of a GS10 glass is also disclosed in EP 1 598 845 A2. In both EP 1 598 845 A2 and U.S. 5,979,187 B, the conductor material is tungsten and the tubular lamp body, into which the conductor is inserted and in which the lamp is also arranged, is preferably made of quartz glass. U.S. 5,979,187 B relates to a flashlamp or laser lamp. The sealing glass, which is also referred to as intermediate glass and is preferably a GS10 glass, is applied by melting a rod onto a rotating electrode. U.S. 5,979,187 B constitutes the closest prior art, as does EP1 598 845 A1.

U.S. Pat. No. 2,316,999 B has disclosed, for glass/tungsten fusing in discharge lamps, manually fusing the glass bead made of a sealing glass which has a coefficient of expansion that lies between the coefficient of expansion of the conductor and of the filling glass.

DE 886 043 C, too, shows a similar arrangement to U.S. Pat. No. 2,316,999 A, but no indications are given there as to how the glass fusion bead is produced.

JP 2012/199153 A2 also discloses a flashlamp having a quartz glass receptacle and tungsten electrode, wherein a cylindrical glass bead is used and is fused onto the tungsten electrode.

From EP 1006560 B1 a feedthrough has made known for a high-pressure discharge lamp with a body. The tube like element of the body according to EP 1006560 B1 is out of a ceramic material. The ceramic material according to EP 1006560 B1 comprises Yttrium-Aluminium-Granat (YAG), which is not a glass ceramic system, but a crystalline compound.

EP 0982278 B1 discloses a body for a high-pressure discharge lamp. Also the discharge lamp housing according to EP 0982278 B1 is a ceramic housing.

As a sealing material for the high pressure discharge lamp a ceramic seal composite or soft porcelain of $Al_2O_3$—$SiO_2$—$Dy_2O_3$ is used. The thermal behavior of such a ceramic seal composite is described in Liu Yuzhu, Geng Zhiting, Zhuang Weidong, He Huaqiang "Study on thermal expansion behavior of $Dy_2O_3$—$Al_2O_3$—$SiO_2$ glass", Journal of Rare earth, 26 (2008) 85-88. Such a sealing material is totally different to a glass material.

A disadvantage with all of the methods known from the prior art was that these have been very laborious on account of the large number of method steps. For example, it was customary in the prior art to preheat the glass and the electrode. A glass bead was then formed from the preheated glass, which after cooling was applied manually to the individual conductors in order to be inserted, together with the conductor, into the envelope or into the filling element of the lamp body and subsequently to be fused, using the sealing glass or intermediate glass, with the envelope or the filling element. All methods for producing glass beads according to the prior art have the disadvantage that the glass beads can only be produced manually, leading to very laborious manufacture.

What is needed in the art is a way of overcoming the disadvantages of the prior art, and especially that of specifying an alternative method and an alternative body that is easy to produce.

SUMMARY OF THE INVENTION

Exemplary embodiments disclosed herein provide bodies with a tubular element made of glass and a conductor surrounded by a further glass material that forms a hermetic seal between the tubular element and the conductor and that comprises a sintered glass which completely surrounds the conductor after being fused on and hermetically seals it with respect to the tubular element.

In some exemplary embodiments provided according to the present invention, a body, such as a lamp body, includes a tubular element made of a glass or glass-ceramic material. A conductor having a further glass material, which surrounds the conductor, is introduced into the tubular element. The further glass material forms a hermetic seal between the tubular element made of glass or glass-ceramic material and the conductor.

Further exemplary embodiments provided according to the present invention are described further herein.

In contrast to EP 1006560 B1 the tube like element is not made of ceramic material but out of a glass or a glass ceramic material, such as quartz glass. The use of quartz glass has the advantage of high transparency, especially for visible light.

In some embodiments, the further glass material is not a conventional glass, but rather a sintered glass, which may be produced from a glass powder. By way of example, the sintered glass is in the form of a sintered glass ring, and the sintered glass ring, like the glass bead according to the prior art, is applied to the conductor. If the conductor is then inserted with the sintered glass ring into the tubular element and the sintered glass material is fused, a hermetic seal is provided between the tubular body and the conductor. The sintered glass materials surprisingly achieve sufficient hermeticity, i.e. gastightness, after fusing the sintered glass material with a conductor and/or the glass material of the tubular element, even at high temperatures of more than 600° C., such as more than 800° C., more than 1000° C., and up to 2000° C., such as 1500° C. Such high temperatures arise, for example, in high-power lamp bodies, such as for example cinema lamps. "Hermetically sealed" or "gastight" is understood in the present application to mean that the He leakage rate is at least less than $1*10^{-8}$ mbar s$^{-1}$ at a pressure difference of 1 bar. The He leakage rate may be at least less than $1*10^{-9}$ mbar s$^{-1}$.

The usage of sintered glass as sealing material is totally different to the ceramic sealing material made known from EP 1006560 B1 or DE 69931877 T2. The usage of a sinter glass as a sealing material distinguishes in that an amount of air is included, which inhibits crack propagation. Sinter glasses are made by sintering glass powder to porous glasses. Sintering is to be understood to pack up powder under high pressure. For sinter glasses, borosilicate containing glasses could be used.

For example alkaliborosilicate-glasses could be segregated into a soluble (sodium rich borate phase) and a non-soluble (silicate=matrix) phase if said glass is subject of a thermal treatment. By extraction with a mineral acid the soluble phase can be removed and a silicate network remains. By a following sintering process a silicate sinter glass can be produced which in his properties is only a little bit different from quartz glass.

Likewise surprising to those skilled in the art is the fact that the glass materials having very high transformation temperatures Tg of more than 500° C., such as more than 550° C. or more than 570° C., and thus concomitant high softening temperatures, at a viscosity of $\eta=10^{7.6}$ dPa/s, of more than 800° C., such as more than 900° C., can be sintered to give a glass ring which, after fusing with the conductor and/or the tubular element, possesses sufficient hermeticity, i.e. gastightness, as a sealing material. This is all the more the case since processing the glass material at temperatures of greater than 800° C. is problematic.

In contrast to the glass beads as sealing glass, as used in the prior art, that feature a high transparency, the sintered glass ring is, in some embodiments, not a transparent glass, but rather milky and cloudy and, as a result, the sintered glass ring can be easily identified on account of its different optical properties. The different manner of production of the sintered glass ring thus leads to visibly different glass seals in the form of sintered glass rings compared to the glass beads in the prior art. The sintered glass body is, in contrast to the glass beads from the prior art, opaque on account of incorporated air bubbles and can be clearly distinguished from glass beads from the prior art. The different optical properties of the sintered glass are also retained when the sintered glass ring is melted to produce the gastight connection of lamp body and conductor.

In order to bridge the large difference in coefficient of expansion between the glass material of the tubular element and the conductor material that is inserted into the tubular element, and therefore to guarantee hermeticity, i.e. gastightness, as previously defined, it is advantageous for the coefficient of expansion of the further glass material used as sealing glass to lie between the coefficient of expansion of the glass or glass-ceramic material of the tubular element and the coefficient of expansion of the conductor. If the coefficient of thermal expansion of the further glass material of the sealing glass is identified as $\alpha_1$ and the coefficient of thermal expansion of the glass or glass-ceramic material of the tubular element as $\alpha_2$ and also the coefficient of expansion of the conductor as $\alpha_3$, it is thus advantageous if the value of the first coefficient of expansion $\alpha_1$ lies between the values of $\alpha_2$ and $\alpha_3$. Such a seal is referred to as a "direct seal".

In some embodiments, the sealing element does not consist of a single glass, but rather of a plurality of glass materials having stepped coefficients of expansion $\alpha_1$ to $\alpha_n$ and for the glass material of the tubular element to have the value $\alpha_{n+1}$. The value of the coefficient of expansion of the conductor is $\alpha_{n+2}$. The values of the coefficients of expansion $\alpha_1$ to $\alpha_n$ then lie between the value of the coefficient of expansion of the glass material of the tubular element $\alpha_{n+1}$ and the value of the coefficient of expansion of the conductor $\alpha_{n+2}$. Such sealing glasses are referred to as "graded seal" and are used primarily when high currents need to be conducted into the lamp body, which leads to high temperature rises of the lamp body and of the supply line, which may be made of tungsten, of more than 800° C. In the event of large diameters of the conductor, it may not be possible to bridge the difference in expansion between conductor and lamp bulb with a direct seal. In such a case, a graded seal is then used, which bridges the difference in expansion.

The glass material used for the lamp body may be quartz glass, which features a high transparency in the 190 nm-3500 nm region and in particular is also transparent to UV light.

The coefficient of expansion of quartz glass as glass of the tubular body is $0.5-0.6*10^{-6}$ K$^{-1}$. The coefficient of expansion of the conductor, which may be made of tungsten, is $4.4*10^{-6}$ K$^{-1}$. The coefficients of expansion of the glass materials according to the present invention that are used by way of example for the sintered glass ring are intermediate, as shown by the following Table 1.

TABLE 1

Coefficients of expansion of glasses used by way of example

| Coefficient of expansion $10^{-6}$ K$^{-1}$ Quartz glass $0.5-0.6*10^{-6}$ K$^{-1}$ | Glass Type |
|---|---|
| 1.1 | Glass 1 |
| 1.2 | |
| 1.3 | Glass 6 |
| 1.4 | |
| 1.5 | Glass 5 |
| 1.6 | |
| 1.7 | |
| 1.8 | Glass 2 |
| 1.9 | |
| 2.0 | Glass 7 |
| 2.1 | |
| 2.2 | Glass 9 |
| 2.3 | |
| 2.4 | |
| 2.5 | Glass 3 |
| 2.6 | |
| 2.7 | Glass 8 |
| 2.8 | |
| 2.9 | Glass 4 |
| 3.0 | |

If the sintered glass body consists of a single sealing glass (e.g. Glass 1), this is referred to as a direct seal. If, in contrast, the sintered glass body consists of a plurality of sealing glasses, this is referred to as a graded seal. For a graded seal, the glass powders are initially pressed separately and the compacts are subsequently sintered together, resulting in the graded seal.

Examples of a direct seal and a graded seal are:
Direct seal: tungsten-Glass 1-quartz glass
Graded seal: tungsten-Glass 4-Glass 3-Glass 2-Glass 1-quartz glass If quartz glass is used as glass material for the tubular element, the quartz glass furthermore permits a high lamp operating temperature on account of its high softening temperature. The extremely low expansion of the quartz glass is a further advantage, leading to a high temperature shock resistance.

As previously mentioned, the sealing glass used is by way of example a borosilicate glass such as the sealing glass Glass 1, Glass 2, Glass 3, Glass 4, Glass 5. Glass 6, Glass 7, and Glass 8 are also useful as alternative glasses. With regard to the properties of these glasses, reference is made to www.schott.com. Glass 6, Glass 7, and Glass 8 are intermediate glasses that can be fused with other glasses.

In order to identify the glass bead in the form of a sintered glass ring with color, it is possible to add a color component to the sealing glass, for example CoO, $Fe_2O_3$, $CrO_2$. The color components may be added to the glass powder prior to sintering the glass ring.

Exemplary materials used for the conductor are tungsten, molybdenum, or Kovar. Materials having a coefficient of thermal expansion that is as close as possible to the thermal expansion of the lamp bulb may be used, in order to require the bridging by the sealing glass of the smallest possible difference in thermal expansion.

In addition to the body, such as a lamp body, according to the present invention, the present invention also relates to a method for producing a glass material that forms a seal between a tubular element and a conductor. The method according to the present invention is characterized in that the glass material is ground, dry pressed and sintered.

The process according to the present invention for producing a sintered glass ring is markedly less laborious compared to the conventional processes and permits the production of many glass rings in parallel, leading as a result to a reduction in manufacturing outlay and especially also in costs.

A further advantage of the method provided according to the present invention is that practically consistent dimensioning of the glass ring is possible with low tolerances using the sintered glass ring. Any influence on quality, for example, by a user during the production of the glass bead can therefore be excluded. Some embodiments of the method envisage identifying the sintered glass ring as glass bead by color. This is possible by adding color components to the glass powder and sintering them into the glass material. The average particle size of the granules and glass powder is, for example, in the range of 25 to 150 μm. The sintering temperature is in the region of the softening temperature of the glass, which is defined at a viscosity of $10^{7.6}$ dPas. The softening temperatures of the glasses used may be greater than 850° C., such as greater than 900° C. and are in the range of 850° C. to 1500° C., such as 900° C. to 1400° C.

A glass bead made of sintered glass which is used as sealing material has the further advantage over the prior art that sintered bodies can have a certain proportion of incorporated air bubbles. This proportion is in the range of 5% to 20% by volume. Such bubbles have the advantage of inhibiting crack propagation in glasses. A crack in a glass has a very narrow radius at its tip. If the crack is under tensile stress, a very high notch effect arises as a result of the narrow radius at the tip, which allows the crack to propagate onwards. If such a crack encounters an air bubble, the bubble diameter now defines the radius at the crack tip that is responsible for the notch effect. Since these radii of the air bubbles are, however, considerably larger than the radii of conventional cracks, the notch effect decreases and the crack comes to a stop. The sintered glass ring thus provides sealing glass with markedly smaller cracks and probabilities of cracks. The air bubbles are also still present in the sintered glass when this has been fused with the conductor and/or the glass or glass-ceramic material of the tubular element.

In contrast to EP 1006560 B1 the glass pearl is put on the lamp body as sealing material, whereas in EP 1006560 B1 the sealing material is brought in between the lamp body and the electrode. Further the sealing material in the state of the art, especially EP 1006560 B 1, is a ceramic or a soft porcelain which is totally different to a sinter glass as sealing material.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
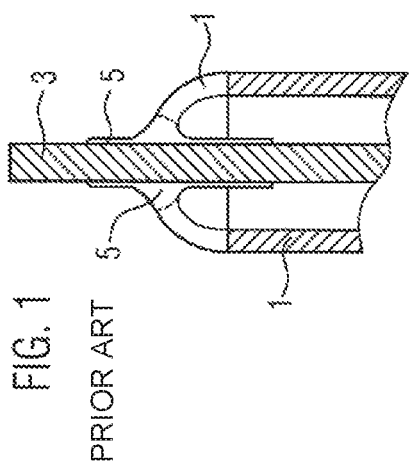
FIG. 1 illustrates a lamp body provided according to the prior art.

FIG. 1 shows a lamp body consisting of a tubular element 1 into which a conductor 3, which may be made of tungsten, is inserted. At the location at which the conductor is inserted into the tubular lamp body, a glass bead 5 as sealing glass according to the prior art is provided, the glass material of the glass bead having a coefficient of thermal expansion that lies between the coefficients of thermal expansion of the conductor material and of the tubular lamp body. By fusion using the glass bead as sealing glass or as intermediate glass, on account of the choice of the coefficient of expansion of the sealing glass, a conductor is inserted, between the sealing glass and the envelope glass material, substantially without stress into the tubular element in a hermetically sealed, i.e. gastight, manner.

Figure 2:
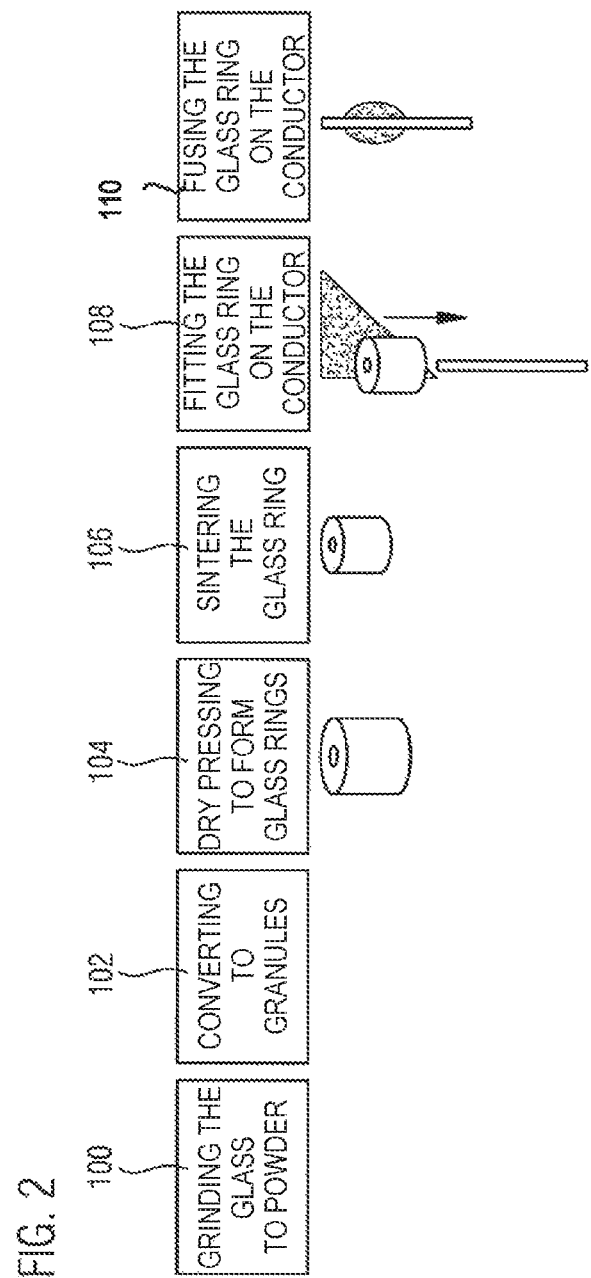
FIG. 2 illustrates steps of an exemplary embodiment of a method provided according to the present invention for producing a sealing glass ring provided according to the present invention.

While applying the glass bead in the prior art was preferably performed in a laborious process, the present invention envisages using (as illustrated in FIG. 2) as sealing glass a sintered glass ring obtained according to the present invention from a glass powder with subsequent sintering, instead of a glass bead that is applied to the conductor in a laborious process.

FIG. 2 shows the individual process steps of an exemplary embodiment of a method provided according to the present invention in detail.

Firstly, a glass material having a high Tg and a high processing temperature, such as, for example, Glass 6, Glass 7, or Glass 8, is ground to give a glass powder, as illustrated in step 100. Subsequently to this, the glass powder is converted into granules as per step 102. Color components may be added to the glass powder prior to conversion to granules for the purpose of unambiguous identification. The granules are then dry pressed to form glass rings as shown in step 104. After dry pressing the glass rings, the glass rings are sintered as per step 106. The sintered glass rings are then guided over the conductors or electrodes and in this way applied or mounted on the conductors or electrodes. This is shown in step 108. Then, in step 110, the sealing glass in the form of a sintered glass ring is fused onto the conductor or the electrode and subsequently the lamp body is hermetically sealed by again fusing the conductor having the sintered sealing glass with the glass or glass-ceramic material of the lamp body. The first fusing of the compact onto the pin already hermetically seals the transition between conductor and glass bead. The glass bead itself also becomes impermeable to gas as a result. Subsequently to this, fusing with the glass or glass-ceramic material of the tubular lamp body is performed as described previously.

The method will be described in more detail herein on the basis of an exemplary embodiment, without being limited thereto.

According to the method, the glass material is firstly ground to give a glass powder. Grinding can be performed, for example, in ceramic drums with addition of ceramic grinding stones. An average particle size of the powder of 10 μm is typically sought. Next, pulverulent color pigments such as, for example, $CoO$, $Fe_2O_3$ or $CrO_2$ are added as needed in a proportion of 0.5-5% by volume, such as 0.5-2% by volume. The powder is mixed with an organic binder such as, for example, Plextol® from Synthomer (www.synthomer.com) and atomized by a nozzle in what is known as a spray tower. The surface tension of the liquid organic binder causes round droplets to form, which, as a result of drying during spraying in the tower, then form round, free-flowing particles—the granules. After grinding and forming granules, the granules are dry pressed to form a glass ring. To this end, in a mechanical press, a cavity that corresponds to the negative of the part to be formed is filled and mechanically pressed. This compact is subsequently freed of the organic binder and sintered in an oven process. The organic binder is expelled from the compact in a first phase at temperatures between 200-300° C. and burnt in the process. The compact subsequently passes through a zone for sintering. The sintering temperature here is the softening temperature of the respective glass. The softening temperature is defined by a glass viscosity of $10^{7.6}$ dPas. For the glass materials that are used for the sealing glass, for example Glass 6, Glass 7, or Glass 8, the softening temperature is in the range of 900° C. to 1200° C. The duration of sintering at or close to the softening temperature is 5 to 30 min.

The sintering affords a mechanically stable shaped body. The conductor is then provided with the sintered glass ring as sealing glass. In a further thermal process, this sintered body or the sintered glass ring is then fused onto the conductor. The temperature for this fusion is in the range of a glass viscosity of $10^6$-$10^4$ dPas. For the glass materials used, for example Glass 6, Glass 7, or Glass 8, the processing temperatures at a viscosity in the range of $10^6$ to $10^4$ dPas are between 1200° C. and 1800° C. During the fusion, as a result of the surface tension of the viscous glass, a round glass bead that is firmly fused with the conductor is formed on the sintered glass ring. The duration for this is once again 5 to 30 min. The components are kept within the process by temperature-stable molds that cannot be wetted by liquid glass, such as for example graphite or boron nitride.

This composite of conductor and intermediate glass, obtained as described above, may subsequently be inserted for example into a tubular quartz glass body and after fusing with the lamp body permits sealing between conductor material and tubular body with the aid of the glass ring or the glass bead, with connection of the quartz glass body to the conductor via the glass ring or the glass bead in a hermetically sealed manner.

The body provided according to the present invention and the method provided according to the present invention for producing a sealing glass in the form of a sintered glass ring, compared to conventional methods, features easier producibility, high quality of the glass bead, reproducible dimensions and tolerances, and also the possibility of adding coloring components. The glass bead is further distinguished by the fact that cracks are avoided.

A further advantage of exemplary embodiments provided according to the present invention is that a color or a hidden marker can be incorporated into the sintered glass and the product can be unambiguously identified using the color or using a hidden marker, and thus protection against product counterfeits is made possible by the novel method.

Exemplary glasses that can be used as the at least one further glass material of the sintered glass are described in Table 2 and Table 3, with the compositions of each glass being provided in wt-% of the respective components.

TABLE 2

Exemplary compositions of the at least one further glass material

| | Glass 1 | Glass 2 | Glass 3 | Glass 4 | Glass 5 | Glass 6 |
|---|---|---|---|---|---|---|
| $SiO_2$ | 85 | 81 | 79 | 78.5 | 83 | 82 |
| $B_2O_3$ | 10 | 11 | 11 | 10.5 | 10 | 13 |
| $Al_2O_3$ | 4.5 | 5 | 5 | 5 | 5 | 5 |
| BaO | 0.5 | 2 | 2 | 2 | 1.5 | 0 |
| $Fe_2O_3$ | <0.1 | <0.1 | <0.1 | <0.1 | 0 | 0 |
| CaO | 0 | 0 | 1 | 1 | 0.5 | 0 |
| $K_2O$ | 0 | 0 | 2 | 3 | 0 | 0 |
| $Na_2O$ | 0 | 0 | 0 | 0 | 0 | 0 |

TABLE 3

Exemplary compositions of the at least one further glass material

| | Glass 7 | Glass 8 |
|---|---|---|
| $SiO_2$ | 87 | 84.5 |
| $B_2O_3$ | 12 | 10 |
| $Al_2O_3$ | 0 | 2.5 |
| BaO | 0 | 0 |
| $Fe_2O_3$ | 0 | 0 |
| CaO | 0 | 0 |
| $K_2O$ | 0 | 0 |
| $Na_2O$ | 1 | 3 |

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A body, comprising:
    a tubular element made of a glass or a glass-ceramic material;
    at least one conductor introduced into the tubular element; and
    at least one further glass material surrounding the at least one conductor and connected to the tubular element, the at least one further glass material forming a hermetic seal between the tubular element and the at least one conductor and the at least one further glass material comprising a sintered glass which completely surrounds the at least one conductor after being fused on and hermetically seals it with respect to the tubular element, wherein the hermetic seal exhibits a He leakage rate at least less than $1*10^{-8}$ mbar s$^{-1}$ at a pressure difference of 1 bar.

2. The body of claim 1, wherein the sintered glass is a sintered glass ring.

3. The body of claim 1, wherein the at least one further glass material has a first coefficient of expansion $\alpha_1$ and the tubular element comprises a glass or a glass-ceramic material having a second coefficient of expansion $\alpha_2$ and the at least one conductor has a third coefficient of expansion $\alpha_3$ and the value of the first coefficient of expansion $\alpha 1$ lies between the value of the second coefficient of expansion $\alpha_2$ and the third coefficient of expansion $\alpha_3$.

4. The body of claim 1, wherein the at least one further glass material comprises a plurality of further glass materials having stepped coefficients of expansion $\alpha_1$ to $\alpha_n$ and the tubular element comprises a glass or a glass-ceramic material having a second coefficient of expansion $\alpha_{n+1}$ and the conductor has a third coefficient of expansion $\alpha_{n+2}$ and the values of the stepped coefficients of expansion $\alpha_1$ to $\alpha_n$ lie between the value of the second coefficient of expansion $\alpha_{n+1}$ and the third coefficient of expansion $\alpha_{n+2}$.

5. The body of claim 1, wherein a transformation temperature Tg according to ISO 7884-8 of the at least one further glass material is greater than 500° C.

6. The body of claim 1, wherein a softening temperature according to ISO 7884-3 of the at least one further glass material at a viscosity of 107.6 dPa*s of the glass material is greater than 850° C.

7. The body of claim 1, wherein the coefficient of thermal expansion $\alpha_1$ of the at least one further glass material is in the range of $1.1*10^{-6}$ K$-1$ to $4.0*10^{-6}$ K$^{-1}$.

8. The body of claim 1, wherein the glass or glass-ceramic material of the tubular element is quartz glass.

9. The body of claim 8, wherein the quartz glass is transparent to UV light.

10. The body of claim 1, wherein the at least one further glass material has the following composition in wt-%:
    $SiO_2$ 78.5-85;
    $B_2O_3$ 10-11;
    $Al_2O_3$ 4.5-5;
    BaO 0.5-2;
    $Fe_2O_3$ <0.1;
    CaO 0-1;
    $K_2O$ 0-3; and
    $Na_2O$ 0-3.

11. The body of claim 1, wherein the at least one further glass material is visibly different from the tubular element.

12. The body of claim 11, wherein the at least one further glass material comprises a color component.

13. The body of claim 11, wherein the at least one further glass material is cloudy.

14. The body of claim 1, wherein the at least one further glass material incorporates air bubbles and is opaque on account of the incorporated air bubbles.

15. The body of claim 14, wherein the incorporated air bubbles are a proportion in the range of 5% to 20% of a volume of the at least one further glass material.

16. The body of claim 1, wherein a material of the at least one conductor is one of the following materials:
    tungsten;
    molybdenum; or
    an iron-nickel-cobalt alloy.

17. The body of claim 1, wherein the at least one further glass material is a single glass material directly forming the hermetic seal between the tubular element and the at least one conductor.

18. A method for producing a hermetic seal between a tubular element made of a glass or a glass-ceramic material for a lamp body and a conductor having a further glass material in the form of a sintered glass, the method comprising the following steps:
    grinding the further glass material to give a glass powder;
    forming granules from the glass powder;
    dry pressing the granules to form a glass ring;
    sintering the glass ring;
    providing the conductor with the glass ring;
    fusing the glass ring to the conductor; and
    hermetically sealing the conductor and the tubular element with the glass ring by fusing to form a hermetic seal exhibiting a He leakage rate at least less than $1*10^{-8}$ mbar s$^{-1}$ at a pressure difference of 1 bar.

19. A lamp body for a lamp, comprising:
    a tubular element made of a glass or a glass-ceramic material;
    at least one conductor introduced into the tubular element; and
    at least one further glass material surrounding the at least one conductor and connected to the tubular element, the at least one further glass material forming a hermetic seal between the tubular element and the at least one conductor and being visibly different from the tubular element, wherein the at least one further glass material incorporates air bubbles and is opaque on account of the incorporated air bubbles.

20. The lamp body of claim 19, wherein the incorporated air bubbles are a proportion in the range of 5% to 20% of a volume of the at least one further glass material.

* * * * *